UNITED STATES PATENT OFFICE.

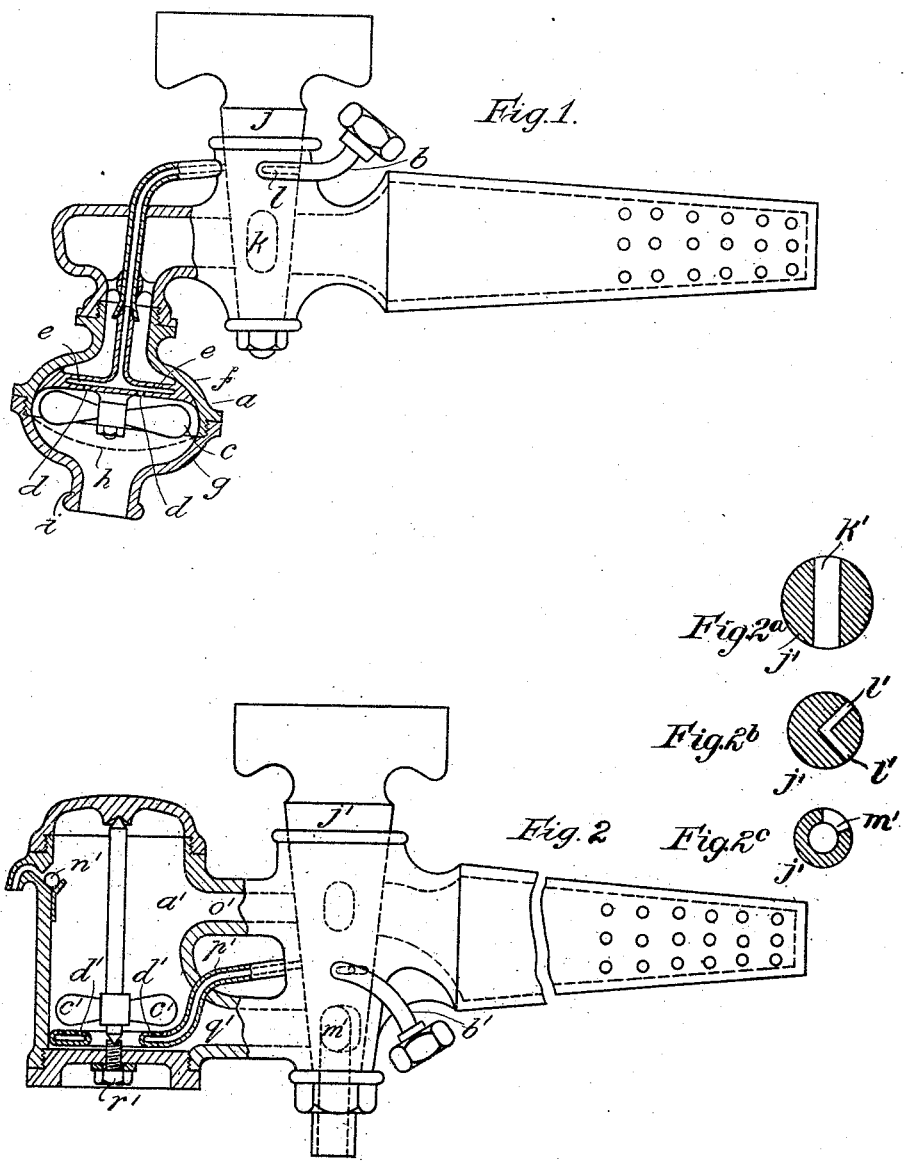

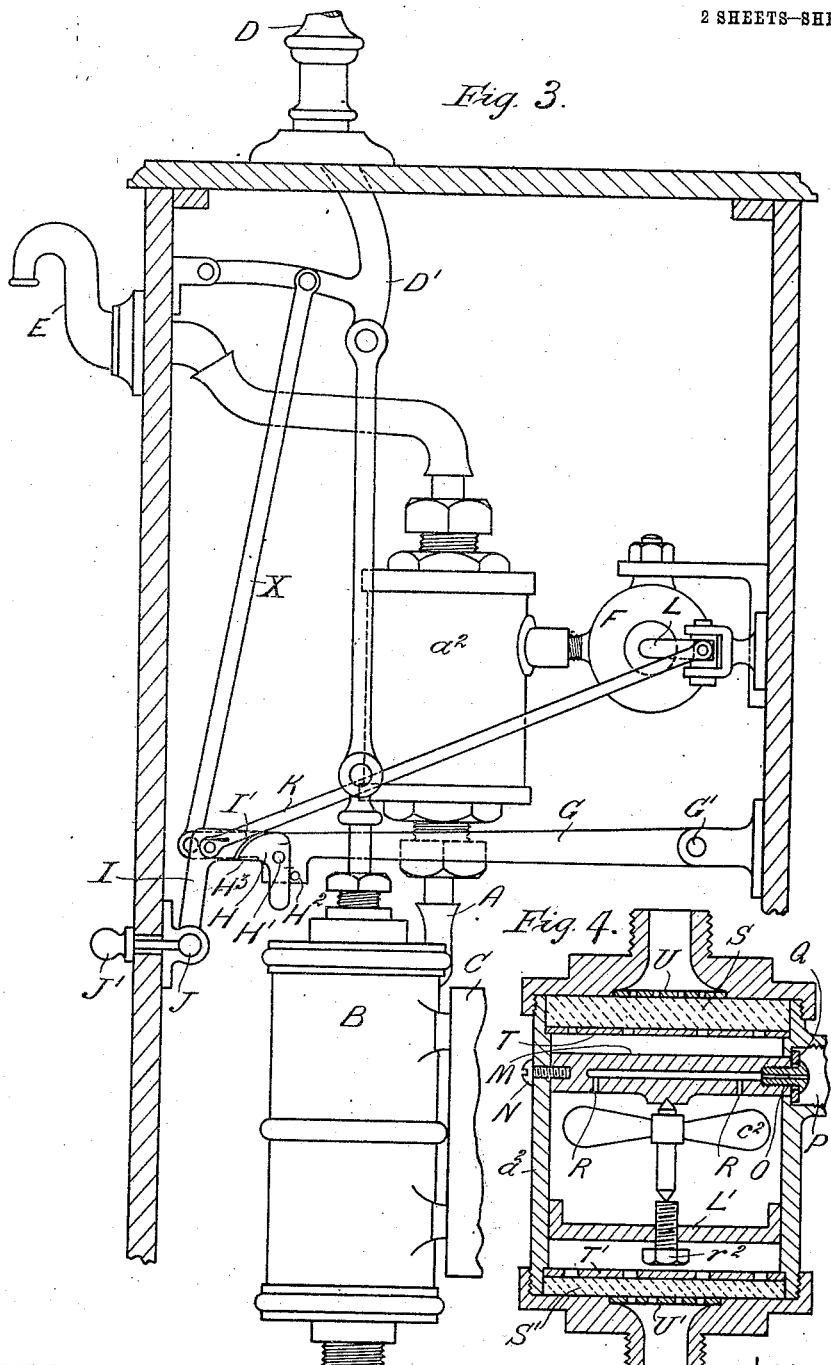

HENRY GEORGE SMART, OF PORTSMOUTH, ENGLAND.

APPARATUS FOR CARBONATING LIQUIDS.

1,054,800.   Specification of Letters Patent.   Patented Mar. 4, 1913.

Application filed June 18, 1910. Serial No. 567,636.

*To all whom it may concern:*

Be it known that I, HENRY GEORGE SMART, a subject of the King of the United Kingdom of Great Britain and Ireland, residing at Portsmouth, England, brewers' engineer, have invented a certain new and useful Improvement in Apparatus for Carbonating Liquids, of which the following is a specification.

The object of this invention is an improved apparatus for carbonating or aerating beer, cider, and other beverages as they are drawn off from the casks or other transport receptacles.

The improved apparatus is so constructed that the beverages are quickly and efficiently carbonated in such a manner that the degree of carbonation may be readily adjusted to suit the taste of the consumer.

Although the invention is primarily intended to replace completely the usual means of carbonation during manufacture of the beverage, yet it may be employed as a supplementary means for improving poor beverages by supplying them with additional carbon dioxid.

In the use of the apparatus, carbon dioxid is mixed with the beverage as the latter is drawn off from the cask or other receptacle into the glass or measure, the supply of carbon dioxid being stopped when desired and the remainder of the glass, etc., being filled with beverage drawn, without alteration, from the cask, etc. As the carbon dioxid is passing into the beverage, it drives a stirrer which violently agitates the beverage and insures proper absorption of the gas.

In the forms of apparatus shown in the accompanying drawings:—Figure 1 represents a draw-off tap adapted to deliver carbonated or uncarbonated beverage, in accordance with the invention. Fig. 2 represents a modification of the arrangement shown in Fig. 1. Figs. $2^a$, $2^b$ and $2^c$ are horizontal sections through the various ports and passages of the tap plug. Fig. 3 shows the application of the invention to a beer engine. Fig. 4 is a sectional view of the mixing-chamber employed in the arrangement shown in Fig. 3.

Referring to Fig. 1, the draw-off tap has at its outlet a chamber $a$. The gas is supplied under pressure to this chamber by means of a pipe $b$ and the beverage in the chamber $a$ is violently agitated, during carbonation, by an agitator or stirrer $c$ driven by jets of gas issuing from small holes in the lower parts $d$ of radial arms $e$ extending from the end of the gas inlet pipe. The chamber casing is made up of separable parts, $f$, $g$, to render the agitator accessible. Gauze wire or other straining material $h$ is arranged just below the agitator. The plug $j$ has two ports or passages $k$, $l$. The passage $k$ is a straight-through passage which controls the flow of the beverage, and the passage $l$ is a right-angle passage which controls the gas supply. When the plug $j$ is turned through a right angle in a clockwise direction from the position shown in the drawing, the beverage and the carbon dioxid both pass to the chamber $a$. When the plug is turned through a right angle in counter clockwise direction from the position shown in the drawing, the beverage flows from the tap but no gas is allowed to mix with it. The degree of carbonation given to the total quantity of beverage drawn off into the glass, etc., may be varied by turning the tap in the clockwise direction to yield a quantity of highly carbonated beverage and then turning the tap in the other direction to fill the glass, etc.

In the modification shown in Figs. $2^a$, $2^b$, $2^c$, 2, the plug $j^1$ has three ports or passages $k^1$, $l^1$, $m^1$. The arrangement of ports shown in these figures is found to work most satisfactorily in practice. The port $k^1$ which controls the entry of beverage to the chamber $a^1$ is a straight-through port. The port $l^1$ which controls the gas supply is a right-angled port, each of its limbs making an acute angle with the center line of the port $k^1$. The port $m^1$ extends upward from the bottom of the plug $j^1$ and has a horizontal limb which broadens out toward the circumference of the plug $j^1$ as indicated in Fig. $2^c$. When the plug $j^1$ is turned through a right-angle in a clockwise direction from the position shown in the drawings, the beverage passes to the chamber $a^1$. When the liquid has risen to a certain height in the chamber $a^1$, it closes a valve $n^1$ of any suitable construction. The further escape of air from the chamber $a^1$ is thereby prevented, and the flow of beverage into the chamber ceases as soon as the back pressure in the channel $o^1$ equals the pressure in the cask, etc. When the plug $j^1$ is turned farther in the clockwise direction, the port $k^1$ is closed but the port $l^1$ is open and allows gas to pass from the pipe $b^1$ to the pipe $p^1$. The gas issues from small holes in the upper part $d^1$ of the pipe and drives the agitator $c^1$. The flow of the gas ceases when the internal pressure in the chamber $a^1$ reaches the pressure in the gas supply pipe $b^1$. When the plug $j^1$ is turned still farther in the clockwise direction, the port is closed, but the port $m^1$ is opened to the passage $q^1$. The carbonated beverage then flows into the glass, etc., held below the tap, the valve $n^1$ permitting air to enter the chamber $a^1$ to take its place. When the plug $j^1$ is turned through a right angle in counter-clockwise direction from the position shown in the drawings or through three right angles in a clockwise direction, the ports $k^1$ and $m^1$ are opened, but the other ports are closed. Beverage then passes through the chamber $a^1$ and thence to the glass, etc., without being carbonated. The spindle which carries the agitator may be adjusted by means of a set screw $r^1$. The degree of carbonation can be varied to suit the taste of the consumer by drawing off one or more charges of carbonated beverage and then filling up the glass with uncarbonated beverage.

In the arrangement shown in Figs. 3 and 4, a mixing chamber $a^2$ is connected by a pipe A to the usual pump B bolted to a block C. When the hand lever D is pulled to the left the beverage passes from the pump to the chamber $a^2$ and thence to the ordinary delivery pipe E. The supply of gas to the mixing chamber is controlled by a valve F, which is opened as the lever D makes the first part of its full stroke and is allowed to remain closed during the latter part of the full stroke of the lever D. With this arrangement the degree of carbonation of the beverage drawn off into the glass, etc., held below the pipe E can be readily varied by dwelling more or less on the first part of the full stroke of the lever D. The mechanism for operating the valve F comprises a rod G which is pivoted at $G^1$ and is oscillated by a connecting rod X pivoted in any suitable position on the lower part $D^1$ of the beer engine lever D. The rod G has pivoted to it at $H^1$ a pawl or trip-piece H, which is so loaded that it normally occupies the position shown, its rear edge resting against a stop $H^2$ on the rod G. When the rod is raised from the position shown, the pawl H engages an arm I carried by a pivoted bar J. The arm I is thus turned to the left and pulls with it a connecting rod K, which has its other end secured in a suitable manner to the lever L, which lever L operates the spring-controlled spindle of the valve F. Thus, when the arm I is pressed back, the lever L is vibrated and the valve F is opened. When the rod G has been raised through a predetermined distance, which may be any fraction of its complete stroke, the tip $H^3$ of the pawl H slips past the tip $I^1$ of the arm I, thus allowing the spring to close the valve F and to return the parts L, K and I to their original positions. During the remainder of the stroke of the lever D, the valve F remains closed and the beverage which passes through the chamber $a^2$ to the delivery pipe E is uncarbonated When the lever D makes its return stroke, the pawl H strikes the tip $I^1$ of the arm I. The pawl H is thereby turned about the pivot $H^1$ until its tip $H^3$ slips past the tip $I^1$, after which the parts resume the position shown in the drawing. The agitator $c^2$, Fig. 4, is supported in the mixing chamber $a^2$ by means of a bridge piece $L^1$ having an adjustable bearing screw $r^2$ and by means of a hollow piece M through which the gas passes. The piece M is secured in place by an ordinary screw N and by a hollow screw O through which the gas passes from the channel P. A lead or other washer Q insures a tight joint between the end of the piece M and the wall of the chamber $a^2$. The gas issues from the piece M by way of two or more small holes R and thus drives the agitator $c^2$. Filtering material S, $S^1$, of any nature is inclosed between perforated plates T, U, and $T^1$, $U^1$.

In the various forms described it will be noticed that straining or filtering means have been introduced. These strainers or filters are found in practice to assist greatly in reducing the size of the bubbles of gas, thus, in conjunction with the revolving agitators, giving to the beverage a persistent creamy "head". Moreover, the strainers produce an even flow of liquid by preventing the gas from forcing the beverage violently from the apparatus.

The carbon dioxid is supplied to each of the various forms of apparatus either from a gas reservoir, which is preferably fitted with a reducing valve and gage, or from a small generating plant.

The forms of apparatus described may be modified to any extent provided that they retain the following principle, viz:—that the degree of carbonation can be readily varied to suit the taste of each individual consumer by mixing a variable quantity of beverage carbonated as it is drawn off from the transport receptacle with a variable quantity of beverage not so carbonated, the carbonated portion being agitated during absorption of the carbon dioxid by an agitator driven by the pressure of the carbonating gas.

Having now described my invention what I claim and desire to secure by Letters Patent of the United States is:—

1. Apparatus for carbonating liquids, comprising in combination, a pump, a mixing chamber connected to the pump, a delivery pipe connected to the mixing chamber, a valve for controlling passage of gas to the mixing chamber, manually operated means for operating the pump and concurrently actuating said valve, an agitator within the mixing chamber, and means for supporting the agitator within the mixing chamber including a hollow member formed with openings permitting the passage of gas to operate the agitator.

2. Apparatus for carbonating liquids, comprising in combination, a pump, a mixing chamber connected to the pump, a delivery pipe connected to the mixing chamber, a valve for controlling passage of gas to the mixing chamber, mechanism for operating the valve, said mechanism including a hand lever serving to actuate the pump, a pivoted rod operatively connected with the hand lever, a second lever, said second lever being in operative relation with the valve, a connecting rod connected at one end to said second lever and means operatively connected with the first mentioned rod and serving to impart movement to the connecting rod, an agitator within the mixing chamber, and means fitted in the mixing chamber for permitting the passage of gas to operate the agitator.

3. Apparatus for carbonating liquids, comprising, in combination, a pump, a mixing chamber connected to the pump, a hand lever controlling passage of liquid from the pump to the mixing chamber, a liquid delivery pipe connected to the mixing chamber, a valve for controlling the passage of gas to the chamber, mechanism for operating the valve comprising a pivoted rod, a connecting rod connected at one end to said hand lever, and at the opposite end to said pivoted rod, a trip member pivoted to said pivoted rod, a pivoted bar having an arm adapted to be engaged by said trip member, a second lever, said second lever being operatively connected with the valve, a second connecting rod connected at one end with said second lever and at the other end with said arm, an agitator within the mixing chamber, and means fitted in the mixing chamber for permitting passage of gas to operate the agitator.

4. Apparatus for carbonating liquids, comprising, in combination, a pump, a mixing chamber connected to the pump, a delivery pipe connected to the mixing chamber, a valve for controlling the supply of gas to the mixing chamber, a hand lever for actuating the pump, and mechanism for operating the valve, said mechanism having an operative connection with the hand lever, an agitator within the mixing chamber, and means fitted in the mixing chamber for permitting the passage of gas to operate the agitator.

5. Apparatus for carbonating liquids comprising in combination, a liquid delivery member, a carbonating gas supply connection, means for controlling the delivery of liquid through said member and regulating the supply of carbonating gas to the liquid, a mixing chamber connected to said delivery member and to said gas supply connection, and stirring means located within the mixing chamber and adapted to be driven by the carbonating gas.

6. Apparatus for carbonating liquids, comprising, in combination, a pump, a liquid delivery member, a mixing chamber connected to said delivery member, a gas supply pipe connected to said mixing chamber, manually operable means for controlling the delivery of liquid through said member and regulating the passage of gas into said chamber, and a rotary stirrer located within said chamber and adapted to be rotated by the action of the gas admitted to said chamber.

7. Apparatus for carbonating liquids, comprising in combination, a pump, a mixing chamber connected to the pump, a delivery pipe connected to the mixing chamber, a valve for controlling passage of gas to the mixing chamber, manually operable means for operating the pump and concurrently actuating said valve, a rotary agitator within the mixing chamber, and means fitted in the mixing chamber for permitting the passage of gas to rotate the agitator.

In testimony whereof I have signed my name to this specification in the presence of two subscribing witnesses.

HENRY GEORGE SMART.

Witnesses:
    JOHN A. BROOMHEAD,
    HARVEY J. BAVERSTOCK.